United States Patent [19]

Bittner

[11] 4,154,798

[45] May 15, 1979

[54] APPARATUS FOR PRODUCING A HOMOGENEOUS, CHEMICALLY REACTIVE SYSTEM

[75] Inventor: Hans-Joachim Bittner, Butzbach, Fed. Rep. of Germany

[73] Assignee: Luwa AG, Zurich, Switzerland

[21] Appl. No.: 783,733

[22] Filed: Apr. 1, 1977

[30] Foreign Application Priority Data

Apr. 9, 1976 [DE] Fed. Rep. of Germany ....... 2615540

[51] Int. Cl.² ........................... B01J 7/02; C10C 1/20; B01J 1/00
[52] U.S. Cl. .................................. 422/162; 422/205; 422/225; 196/46; 366/303; 366/307
[58] Field of Search .............. 23/285, 270.5 T, 270 R, 23/283, 284, 260, 267 R, 290.5; 159/6 W, 11; 202/117; 208/39, 13; 196/46; 366/303, 307

[56] References Cited

U.S. PATENT DOCUMENTS

| | | | |
|---|---|---|---|
| 2,819,190 | 1/1958 | Kather | 23/270 R X |
| 2,974,725 | 3/1961 | Samesreuther et al. | 159/6 W |
| 3,047,368 | 7/1962 | Marco | 23/290.5 X |
| 3,625,273 | 12/1971 | Buschor | 159/6 WH X |
| 3,709,664 | 1/1973 | Krekeler et al. | 23/283 X |

Primary Examiner—Joseph Scovronek
Assistant Examiner—C. Konkol
Attorney, Agent, or Firm—Spencer & Kaye

[57] ABSTRACT

Apparatus for producing a homogeneous, chemically reactive system of a starting material of highly viscous or pasty consistency, and at least one further reaction partner which is added to the starting material to chemically treat the starting material. The apparatus includes a substantially vertically oriented vessel having a cylindrical interior side wall and a frontal face at the top of the vessel. An inlet opening is provided for the starting material to be treated and an inlet opening is provided for each of the other reaction partners. The inlet openings are disposed in the frontal face of the vessel, are arranged in close juxtaposition when seen in the circumferential direction, and are in the vicinity of the interior wall of the vessel. A driven rotor, studded with a plurality of blades, is coaxially arranged in the interior of said vessel. The rotor has a first ring of blades which is arranged so that it scrapes over the openings of the inlet openings in the form of a knife edge. A plurality of mixing blades are mounted in the wall of the vessel. The mixing blades are adjustable with respect to their angulation and project into the interior of the vessel between two rings of rotor blades.

8 Claims, 3 Drawing Figures

APPARATUS FOR PRODUCING A HOMOGENEOUS, CHEMICALLY REACTIVE SYSTEM

BACKGROUND OF THE INVENTION

The present invention relates to apparatus for producing a homogeneous, chemically reactive system of a starting material of a highly viscous or pasty consistency, particularly, acid resins, which is to be chemically treated under the addition of at least one further reaction partner.

In the re-refining of waste oils, there often are obtained so-called "acid sludges" which contain 20% and more sulfuric acid and which, without the proper processing, cannot be stored without the prescribed measures for the storage of oil- and acid-containing waste materials. These acid sludges contain bituminous components to such a degree that reprocessing the acid sludges could definitely be of economic interest. It is obvious to effect such reprocessing by means of a neutralization reaction. This has the result, however, that the salts formed from the reaction with the sulfuric acid might, in many cases, constitute an annoying factor in the recovered bitumen components. In order to avoid salt formation, a reaction sequence must be provided with which the sulfur component in the acid sludge is released in the form of gaseous $SO_2$, and the $SO_2$ remains in the gaseous phase. Similar problems occur with a series of other starting materials, particularly waste materials.

Regardless of whether in the above-described process the sulfuric acid is to be converted to gaseous $SO_2$ or is to be retained in the bituminous product in the form of its salts, considerable problems arise in performing the chemical reactions at a technical scale, not lastly because the substances which are to be reacted with one another, i.e., generally a viscous or pasty starting material with a reaction partner in powder form and/or of a different viscosity than the starting material, for example, an aqueous reaction partner, are difficult to mix intimately. This difficulty in providing an intimate mixture is particularly troublesome because it is often desired to produce a homogeneous, chemically reactive system very quickly since, for example, the high reactivity between the sulfuric acid and the reaction agent or the water, respectively, has to be considered. As will be apparent from what follows, the present invention is not concerned, in its broadest sense, with a particular chemical reaction itself, but, with producing a homogeneous, chemically reactive system from a starting material which has a highly viscous or pasty consistency.

SUMMARY OF THE INVENTION

An object of the present invention is to provide apparatus for producing a chemically reactive system which contains a starting material of highly viscous or pasty consistency.

Another object of the present invention is to provide apparatus for a method with which it is possible to produce a homogeneous, chemically reactive system in reprocessing a starting material which has a highly viscous or pasty consistency.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, as embodied and broadly described, the present invention provides apparatus for practicing a method for producing a homogeneous, chemically reactive system of a starting material of highly viscous or pasty consistency, and at least one further reaction partner which is added to the starting material to chemically treat the starting material, the method comprising: spreading out the starting material to be treated and the reaction partner or partners, respectively, in a thin layer to bring the starting material and reaction partner or reaction partners into contact with one another through intimate mixing to form a mixed product.

With this mode of operation, it is possible to intimately mix the starting material to be treated and the reaction partner(s) in the required short period of time before the chemical reaction begins. If, for example, in the processing of acid sludges, caustic lime (CaO) is used as the reaction partner or medium and water is added as a further reaction partner, the hydration of the sulfuric acid begins as a result of the intimate mixing (the so-called predistribution), and gaseous sulfur dioxide is formed. In spite of the high viscosity of the mixed product, the sulfur dioxide is able to emanate from the highly viscous mixed product which is spread out in a thin layer and can be extracted in gaseous form. Mixing of the starting material and the reaction partner(s), while simultaneously producing a thin layer, is here a significant process requirement for obtaining the above-described reaction sequence.

The term "water" as used in the above explanations includes water in its normal form, as well as the addition of water in the form of mud, or the like. The latter has the advantage that, for example, when processing acid sludges to obtain the desired bituminous end product, the muds provide a way to introduce the required additives into the reaction mixture, likewise in finely-dispersed form, whereby the uniform predistribution provided by the invention produces in the bitumen the desired finely-dispersed distribution of the solid particles introduced by way of the muds.

It is of particular advantage to produce the thin layer by simultaneously introducing into a closed vessel the reaction partner or partners and the starting material to be treated.

In an advantageous embodiment of the method invention, the thin layer is conducted along the walls of a closed vessel with steady turbulence, the starting material to be treated and the reaction partner or partners are steadily added at the one end of the vessel, and the mixed product is continuously extracted at the other end of the vessel. This mode of operation not only has the advantage that it is possible to attain high throughputs in a flowthrough process, but also has the advantage of avoiding the formation of "streaks" in the thin layer. In addition, this mode of operation has the advantage that, for a reaction in which, for example, sulfuric acid components are converted to sulfur dioxide, the released sulfur dioxide can be extracted directly. Further, in the normal case, if the length of the path to be traversed by the thin layer is dimensioned to correspond to the length of the reaction, the end product is available in the form of a fine-grained powder, while the resulting water vapor and possibly-developed gases, e.g., sulfur dioxide, can be extracted as gases.

If the reaction in the chemical treatment of the starting material is to be guided so that part of the compounds contained in the starting material are converted to the gaseous phase and extracted, then it is of particular advantage to have the flowthrough speed through the vessel correspond approximately to the reaction speed required to completely convert one component of the starting material to the gaseous form. This has the advantage, for example, in processing acid sludges, that initially the sulfuric acid is converted almost completely to sulfur dioxide, while the mixed product leaves the vessel still in pasty form as a homogeneous reactive system. The complete reaction with formation of the powdery end product then takes place only after the major portion of the sulfur dioxide has been extracted so that there are practically no dust removal problems which, due to the particularly small grain size of the powdery end product, would require considerable expenditures.

In a further embodiment of the method invention, the mixed product is spread out in a second thin layer in a further vessel where the flowthrough speed and the turbulence of the second thin layer are less than in the first thin layer. This use of two thin layers can be employed either in the case where a powdery product is formed in the first thin layer or in the case where the first thin layer leaves the first vessel still in pasty form and merely a forming gas is extracted in the first thin layer. The use of two thin layers is of advantage in the mode of operation where a powdery product is already removed from the first thin layer and the reaction partners then complete the reaction during a corresponding period of dwell in the second thin layer. The use of two thin layers is likewise of advantage in the mode of operation in which merely the forming gas is extracted in the gaseous phase and there is no formation of a powdery product in the first thin layer, since the completion of the reaction of the product, which is still in pasty form when it is introduced into the second thin layer, can take place more dependably due to the slow flowthrough speed and the reduced turbulence, and fewer problems occur with respect to the resulting friction heat, etc.

In a still further embodiment of the method, at least one thin layer is cooled or heated indirectly. It is particularly advantageous in this connection for the thin layer to be cooled or heated in zones having different temperatures, preferably in a controlled manner, in order to control the chemical reaction.

The apparatus of the present invention for practicing the above-described method comprises at least one closed, preferably cylindrical, vessel having, in the region of one end of the vessel, at least one inlet opening for the starting material to be treated and at least one inlet opening for each of the other reaction partners, and an outlet opening at the other end of the vessel. A driven rotor is arranged coaxially in the interior of the vessel and is provided with a plurality of blades.

With such a device, it is possible to produce, in the required short period of time, intimate mixing of the starting material and reaction partner(s) in a sufficiently thin layer in spite of the different physical properties of the individual reaction partners, for example, a highly viscous acid sludge, a powdery reaction medium and water, either in liquid form or in the form of mud. The flowthrough speed can here be used to vary, within given limits, the thickness of the thin layer and the degree of turbulence in the thin layer by varying the number of revolutions of the rotor. It is of particular advantage for the vessel to be oriented substantially vertically.

In one advantageous embodiment of the apparatus of the present invention, the inlet openings for the starting material and each reaction partner are arranged in the frontal face of the vessel closely adjacent one another when seen in the circumferential direction. This assures that the starting material and individual reaction partners can come into intimate contact already during the formation of the thin layer under the influence of the rotor. In this connection, it is of advantage if the inlet openings open in the vicinity of the wall of the vessel.

In another advantageous embodiment of the apparatus of the present invention, the rotor has a first ring of blades which is arranged so that it scrapes the openings of the inlet openings in the manner of a knife. With the high number of revolutions required to form and maintain the thin layer, ideal conditions for the intimate mixing of the starting material and reaction partners are assured even during the process of forming the thin layer, in spite of the different physical properties of the starting material and individual reaction partners, by "cutting" into thin "slices" the streams of material entering into the vessel.

In a further advantageous embodiment of the apparatus of the present invention, the blades of the rotor are arranged to convey in the flowthrough direction of the thin layer. In still another advantageous embodiment of the apparatus of the invention, the rotor blades have a substantially rectangular shape and the edge of each rotor blade facing the wall of the vessel passes over the wall with its full length and at a close distance from the wall. This assures not only proper and rapid passage of the thin layer through the vessel, but, also produces the required turbulence in the thin layer.

To support the turbulence formation and to influence the period of dwell, a further embodiment of the apparatus of the invention provides that a plurality of mixing blades are mounted on at least one generatrix of the vessel in the wall of the vessel, the angular position of the mixing blades being adjustable and each mixing blade projecting into the interior of the vessel between two rings of rotor blades.

In an advantageous further embodiment of the apparatus of the invention, the vessel is enclosed by a jacket which is divided into zones, when seen along the length of the vessel, each zone having its own, preferably individually controllable, intake and outlet for a heat transfer medium. This makes it possible, by appropriately controlling the heat transfer medium intake, to influence the reaction temperature within the vessel, the influence of the heat transfer medium being particularly effective due to the material being spread in a thin layer on the walls of the vessel. Controlled temperatures are important in particular with respect to the friction heat produced by the turbulence in the thin layer since this is the only way to prevent the formation of lump-like agglomerates. Depending on the requirements of the chemical reaction taking place, the heat transfer medium may be a coolant or a heating medium so as to be able to influence the reaction speed. It may be advisable in this connection to conduct the heat transfer medium at different temperatures.

It is to be understood that both the foregoing general description and the following detailed description are exemplary, but are not restrictive of the invention.

BRIEF DESCRIPTION OF THE DRAWINGS

The accompanying drawings, in which like numbers indicate like parts, illustrate examples of presently preferred embodiments of the invention and, together with the description, serve to explain the principles of the invention.

Of the drawings.

DESCRIPTION OF THE PREFERRED EMBODIMENTS

Figure 1:
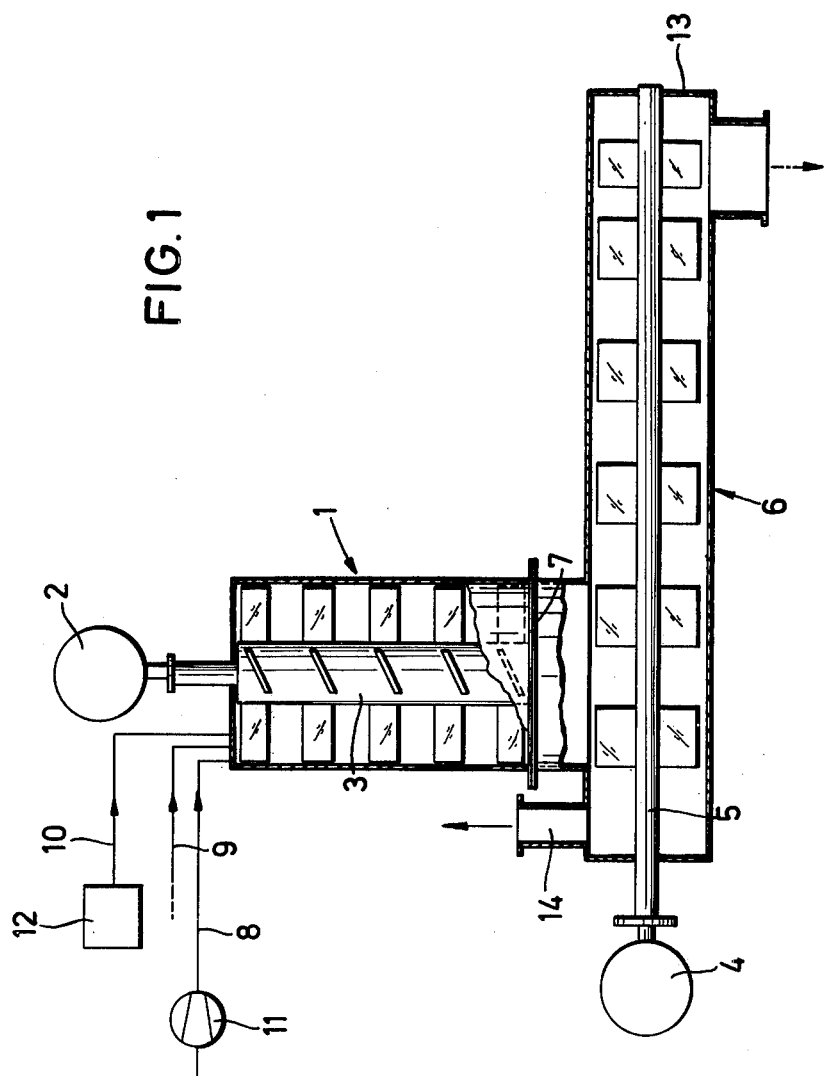
FIG. 1 schematically shows a flow diagram for performing an embodiment of the process of the present invention in which an acid sludge is treated in accordance with the teachings of the present invention.

Referring to the system shown in FIG. 1, a first vessel 1, including a blade-studded rotor 3 which is driven by a motor 2, is arranged vertically above a horizontally oriented reactor vessel 6. Reactor vessel 6 is provided with a rotor 5 driven by a motor 4. Vessel 1 has an outlet opening 7 which is in communication with an inlet opening (not identified) of vessel 6. At the other end of vessel 1, an inlet line 8 for the acid sludge to be treated, an inlet line 9 for water or a water containing additive, respectively, and an inlet line 10 for the reaction medium, open into vessel 1. The acid sludge is conveyed into vessel 1 by means of a pump 11 while the reaction medium is introduced into the vessel 1 through a metering device 12. The water or the water containing additive, respectively, are added either by means of a pump or through a pressurized supply line with the intermediary of an appropriate metering valve.

The treated material is extracted at the outlet end 13 of vessel 6, while the sulfur dioxide released in vessel 1 is extracted together with the likewise produced water vapor through an appropriate extraction line 14 connected in the transition region between vessel 1 and vessel 2. Since the extracted sulfur dioxide is very pure and, depending on the starting product, may develop in large quantities, it can be processed further, for example, it can be converted to calcium sulfite in a slurry of water and calcium hydroxide.

Figure 2:
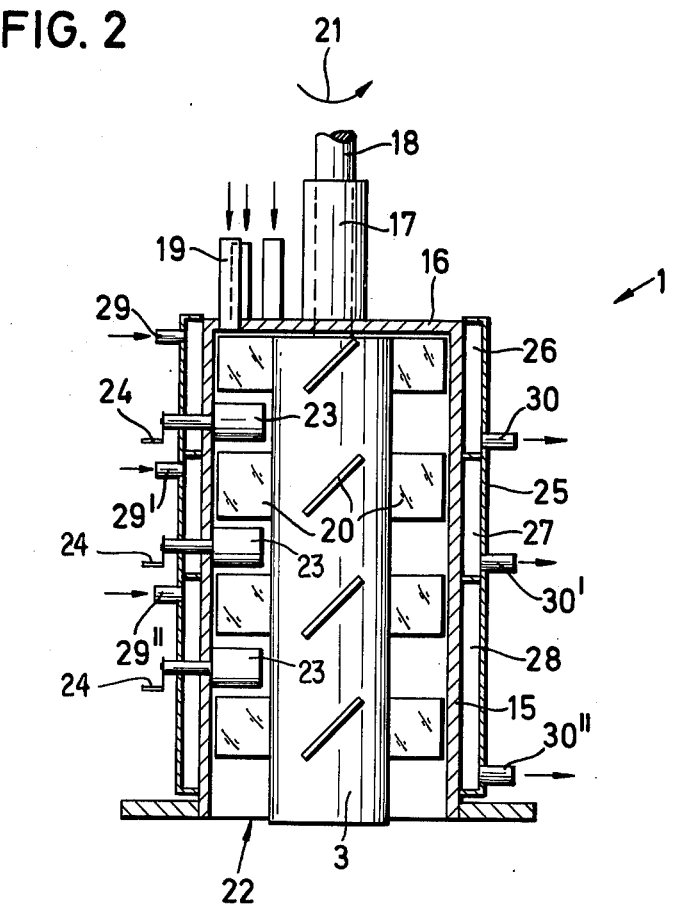
FIG. 2 shows an embodiment of a vessel for producing a thin layer in accordance with the teachings of the present invention.

Turning now to the illustration in FIG. 2, which shows vessel 1 in greater detail, it can be seen that vessel 1 is formed by a tubular, cylindrical wall 15. The upper frontal face of vessel 1 is closed by a cover 16. Cover 16 is provided with a journal box 17 in which rotor 3 is mounted to be freely suspended via its drive shaft 18. In the vicinity of the inner wall of vessel 1, a plurality of inlet openings 19 are arranged in cover 16 in close juxta-position, when seen in the circumferential direction, their number corresponding to the number of reaction partners.

Rotor 3 is provided with a plurality of obliquely-arranged blades 20. Blades 20 are distributed along the length of rotor 3 in the form of rings of blades. Each ring of blades 20 comprises three or more blades which are distributed over the circumference of the rotor. The number of blades in each ring depends on the diameter of rotor 3 and the given speed. Blades 20 are angled with respect to the direction of rotation as shown by arrow 21 so that the products introduced through inlet openings 19 are conveyed in the direction toward the oppositely-arranged outlet opening 22 which is formed by the free-opening cross section of vessel 1. Blades 20 are dimensioned so that their edge facing the interior wall of the vessel passes along this wall at only a slight distance from the wall but over the full length of its edge.

Furthermore, a plurality of mixing blades 23 are mounted in vessel wall 15 along one generatrix of vessel 1. Mixing blades 23 are adjustable in their angular position and settable and fixable via a setting device 24. Mixing blades 23 are arranged so that they each project into the interior of vessel 1 between two rings of rotor blades 20.

On the outside, vessel wall 15 is enclosed by a jacket 25 which is divided into a plurality of zones 26, 27 and 28. Each one of the zones 26, 27, 28 is provided with its own inlet 29, 29', 29", respectively, and outlet 30, 30', 30", respectively. The inlets 29, 29', 29" and outlets 30, 30', 30" are connected with control devices (not shown) to regulate the quantity and/or temperature of a heat transfer medium.

Figure 3:
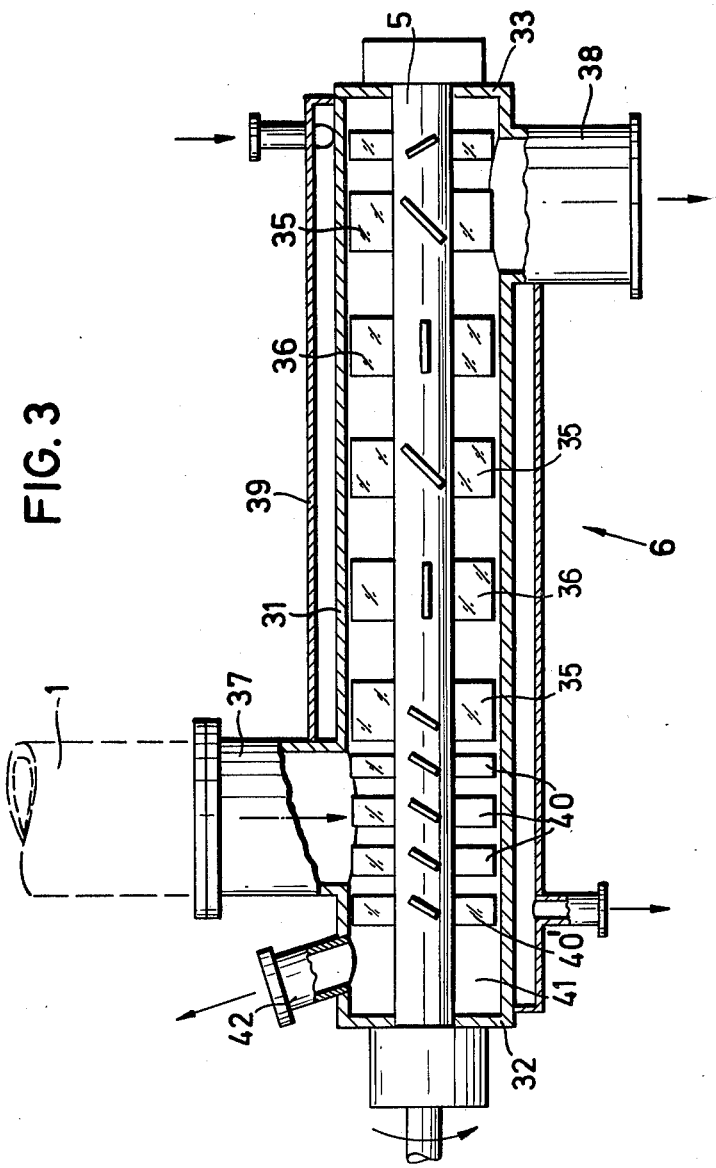
FIG. 3 shows an embodiment of a second vessel which can be connected to the first vessel of FIG. 2 if the process of the present invention is to be performed in two stages.

Turning now to FIG. 3, vessel 6 is shown in greater detail. Vessel 6 is essentially formed by a cylindrical pipe 31 which is closed at both frontal ends by bearing covers 32 and 33. A rotor 5 is mounted in bearing covers 32 and 33 and is provided with a plurality of rings of blades 35 and rings of blades 36. At one end of vessel 6 there is an inlet stud 37 and at the other end an outlet stud 38. Inlet stud 37 is here in communication with outlet opening 22 of vessel 1. The diameter of inlet stud 37 advisably corresponds to the diameter of outlet opening 22 of vessel 1 so as to prevent accumulation of material in the transition region.

Vessel 6 is enclosed by a jacket 39 which may also be subdivided in the same manner as jacket 25 of vessel 1.

In the region of inlet stud 37, rotor 5 is provided with a plurality of rings of blades 40 whose blades are relatively narrow and set at a relatively steep angle in the conveying direction. The length of the individual blades 40 is again dimensioned so that they almost contact the inner wall of vessel 6. Following the conveying rings of blades 40 in the intake region of vessel 6, vessel 6 has rings of rotor blades which are alternatingly (1) angled in the conveying direction, and (2) connected with rotor 5 without angulation. Thus, rings of blades 35 are angled in the conveying direction and rings of blades 36 are connected without angulation.

In the region of inlet opening 37, vessel 6 is extended beyond the inlet stud 37 to form a gas collection chamber 41 from which the sulfur dioxide gases produced in vessel 1 can be extracted through a stud 42. In order to prevent the entrance of material into gas collection chamber 41, at least one additional ring of conveying blades 40' is provided in the region between inlet stud 37 and gas collection chamber 41.

The apparatus for processing acid resins or the like can be operated in two different modes as follows:

In the first mode of operation 1, the apparatus shown schematically in FIG. 1 is fully utilized. The acid sludge to be processed is pressed by means of pump 11 into vessel 1 through the corresponding inlet opening 19 in a given quantity per unit time. Simultaneously, water or water-containing mud is fed into vessel 1 through inlet opening 19 which is connected with inlet line 9. Finally, a quantity of reaction medium, for example, caustic lime (CaO) given by metering device 12, is introduced into the interior of vessel 1. Inlet openings 19 are arranged in close juxtaposition when seen in the circumferential direction of vessel cover 16. The blade-studded rotor 3 is driven by motor 2 at a number of revolutions such that the circumferential speed is, for example, 20 m/sec. The streams of material entering vessel 1 through inlet openings 19 are rapidly distributed by the ring of blades 20 passing closely along the inside of vessel cover 16, they are "sliced off", so to speak, and thrown in finely-dispersed form against the interior walls of vessel 1 so that a thin layer of material is formed at the wall of vessel 1. Due to the high number of revolutions, the thin layer is maintained over the entire length of vessel 1, and the angulation of the rotor blades 20 causes the layer of material to be advanced toward outlet opening 22. The turbulence in the thin layer produced upon transition from one ring of blades 20 to the other can be influenced by mixing blades 23 which are adjustable with respect to their angulation.

The length of vessel 1 and the flowthrough speed of the material through vessel 1 are matched so that all reaction partners are rapidly mixed through and the hydration of the sulfuric acid component in the acid sludge begins. By appropriately controlling the temperature in cooling zones 26, 27, 28, the quantity of heat produced during hydration of the sulfuric acid as well as the friction heat produced by the turbulence in the thin layer can be dissipated so that appropriate regulation of the coolant intake and of the temperature of the incoming coolant permits optimum control of the ongoing chemical and physical processes in the thin layer.

In the first mode of operation, the mixed product leaves vessel 1 through outlet opening 22 still in viscous or pasty form respectively. The gaseous sulfur dioxide is also discharged through outlet opening 22.

The mixed product leaving vessel 1 now enters second vessel 6 where, on the one hand, the gaseous sulfur dioxide is extracted and, on the other hand, the mixed product, which now constitutes a homogeneous reactive system, can complete the reaction in a further thin layer so that it finally leaves the outlet stud 38 of vessel 6 as a fine dry powders. Rotor 5 of vessel 6 is driven at a lower speed than rotor 3 of vessel 1, for example, at a speed corresponding to a circumferential speed of about 4 m/sec. The initially-liquid or pasty, respectively, thin layer forming at the interior wall of vessel 6 is converted during the course of the reaction to a thin layer of powder which is maintained by the blades of the successive rings of blades 35 and 36. In this case, the blades of the rings of blades can either be arranged at rotor 5, as shown in FIG. 3, alternatingly with and without angulation. Alternatively, each ring of blades can contain blades which alternate with and without angulation, with two adjacent rings of such blades being offset with respect to their arrangement of the blades.

In the just-described first mode of operation, only the so-called predistribution to produce a homogeneous reactive system is effected in vessel 1 due to the violent reaction during the sulfuric acid hydration, and the completion of the reaction, i.e., the conversion of the pasty mixed product to a powder takes place in vessel 6. In the second mode of operation, starting products, for example, acid sludges with low sulfuric acid contents, can undergo the entire reaction in a single vessel designed as shown for vessel 1 in FIG. 2 so that already a powdery product passes through outlet opening 22 of this vessel, the outlet opening being in communication with a separating chamber to collect the powdery product and to separate the resulting sulfur dioxides.

If it is desired to keep the sulfuric acid component of the starting product in the bituminous end product, the reaction in the inlet region of vessel 1 must be conducted, possibly with the addition of appropriate reaction media, so that the formation of gaseous sulfur dioxide is prevented and the sulfuric acid is converted to the corresponding salts which are then contained in the powdery end product.

As an example are given the following data:

| | |
|---|---|
| total amount of ingrediences | 11.335 kg/h |
| surface speed of vessel 1 | 30 m/sec. |
| surface speed of vessel 2 | 15 m/sec. |
| inner diameter of vessel 1 | 500 mm |
| inner diameter of vessel 2 | 600 mm |
| thickness of the thinlayers | 1 to 5 mm |
| viscosity | 100.000 to 500.000 cP |

Typical US-composition of waste-oil is:
1 to 6% light ends (b.p. up to 350° F. at 760 torr)
10 to 15% heavy ends (b.p. 350° to 650° F. at 760 torr)
60 to 70% lube stock (b.p. 650° to 800° F. at 760 torr)
0 to 10% bright stock (b.p. 800° to 950° F. at 760 torr)
0 to 10% water
7 to 15% additives
5 to 8% oil oxidation products
1 to 3% particulates It will be understood that the above description of the present invention is susceptible to various modifications, changes and adaptations, and the same are intended to be comprehended within the meaning and range of equivalents of the appended claims.

What is claimed is:

1. Apparatus for producing a homogeneous chemically reactive system of a starting material of highly viscous or pasty consistency and at least one further reaction partner by forming a thin layer of the starting material and reaction partner comprising: at least one closed substantially vertically oriented vessel having a cylindrical interior side wall and a frontal face at the top of the vessel;
   at least one inlet opening for the starting material to be treated and at least one inlet opening for each of the other reaction partners, said inlet openings being disposed in the frontal face of the vessel and arranged in close juxtaposition when seen in the circumferential direction, and being in the vicinity of the interior wall of the vessel,
   an outlet opening at the bottom of the vessel;
   a driven rotor, studded with a plurality of blades, coaxially arranged in the interior of said vessel, said rotor having a first ring of blades which is arranged so that it scrapes over the openings of the inlet openings in the form of a knife edge, the blades of the rotor being angled in a conveying manner in the forward direction of the thin layer, said rotor blades being substantially rectangular in shape, with the edge of each rotor blade facing the interior wall of the vessel passing over said wall with its full length at a close distance from the wall; and
   a plurality of mixing blades mounted in the wall of the vessel on at least one generatrix of the vessel, said mixing blades being adjustable with respect to their angulation and each of said mixing blades projecting into the interior of said vessel between two rings of rotor blades.

2. Apparatus as defined in claim 1 wherein at least part of the vessel wall is enclosed by a jacket, the jacket being provided with openings for the intake and discharge of a heat transfer medium.

3. Apparatus as defined in claim 2 wherein the jacket is divided into zones, when seen over the length of the vessel, each zone having its own inlet and outlet for the heat transfer medium.

4. Apparatus as defined in claim 1 where the vessel is cylindrical.

5. Apparatus as defined in claim 1 wherein the outlet opening of the vertically oriented vessel is in communication with a second horizontally oriented vessel which is also provided with a bladed rotor, said second vessel having: an inlet opening for receiving material from said vertical vessel, a material conveying chamber on one side of said inlet opening of the second vessel, said bladed rotor of the second vessel having blades for directing the flow of material in a direction from the inlet opening of said second vessel through the material conveying chamber, and a gas collection chamber on an opposite side of the inlet opening of the second vessel, the gas collection chamber having a gas exhaust stud.

6. Apparatus as defined in claim 5 wherein at least part of the vessel wall of each vessel is enclosed by a jacket, said jacket being provided with openings for the intake and discharge of a heat transfer medium.

7. Apparatus as defined in claim 6 wherein the jacket is divided into zones, when seen over the length of the vessel, each zone having its own inlet and outlet for the heat transfer medium.

8. Apparatus as defined in claim 5 wherein a ring of conveying blades is provided in the region between the inlet opening and gas collection chamber.

* * * * *